Sept. 13, 1949.   O. L. WAGGONER   2,481,544
COMBINATION DISH AND TRAY
Filed Sept. 3, 1947
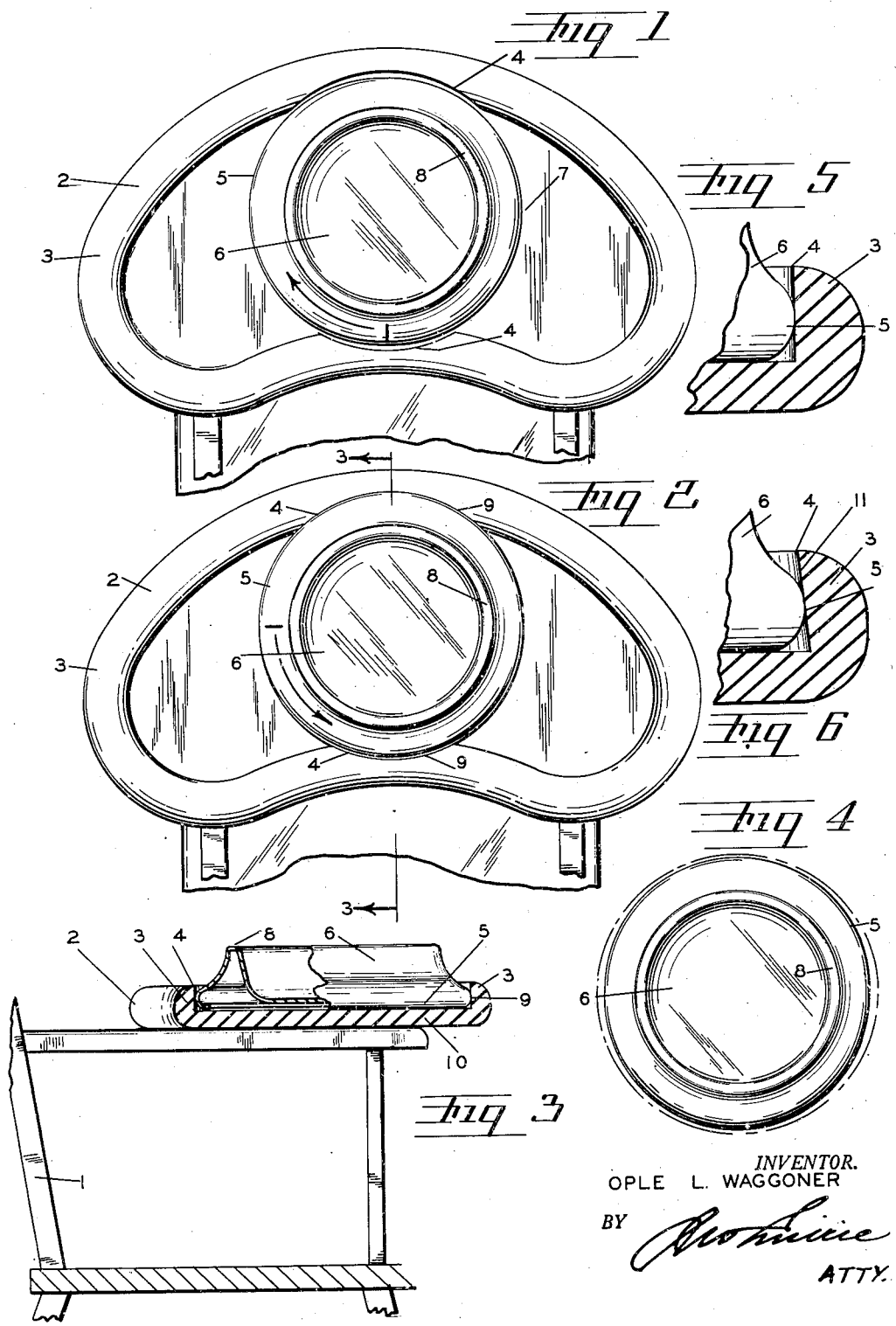
INVENTOR.
OPLE L. WAGGONER Patented Sept. 13, 1949

2,481,544

UNITED STATES PATENT OFFICE 2,481,544

COMBINATION DISH AND TRAY

Ople L. Waggoner, Prineville, Oreg.

Application September 3, 1947, Serial No. 771,853

1 Claim. (Cl. 65—54)

This invention relates to a combination feeding dish and tray and is particularly adapted to be associated with highchairs and the like when feeding infants.

The primary object of the invention is to provide a feeding dish and tray wherein the dish is held in the tray by turning it in one direction and released to be removed by turning it in the opposite direction.

Another object of the invention is to provide simple means whereby a dish can be easily applied to the tray and removed therefrom by an adult.

A further object of the invention is to provide a dish that cannot be removed by the infant.

These and other incidental objects will be apparent in the drawings, specification and claims.

Referring to the drawings:

Figure 1 is a plan view of a tray having my new and improved feeding dish associated therewith, the same being illustrated as having been placed in position prior to locking the dish within the tray.

Figure 2 is a view similar to Fig. 1 except that the dish has been revolved and is held in fixed relation with the tray.

Figure 3 is a sectional view taken through the tray, dish and a fragmentary portion of a highchair.

Figure 4 is a plan view of the dish removed from the tray, having a broken line illustrating a true circle while the dish is illustrated slightly oval, this being the principle employed in the locking of my dish to the tray.

Figure 5 is a fragmentary enlarged detail view illustrating the lower portion of the dish in contact with the flange on the tray.

Figure 6 illustrates another preferred design of the contact point between the tray and the dish.

In the drawings:

I indicates a portion of a high chair, to which is secured my improved tray 2. The tray is completely surrounded by a substantially vertical edge flange 3. At the central portion of the tray the flange 3 is provided with oppositely curved substantially circular notched portions, 4, in opposing inside vertical faces, with which a dish 6 cooperates.

6 indicates a dish, which is generally round, but the lower portion 5 is non-circular, slightly elongated, and somewhat elliptical to cooperate with the surfaces of the notches 4 in the flange on the tray.

When it is desired to secure the dish to the tray, the dish is fitted to the tray within the confines of the edge flange with the longest diameter of the lower portion 5 transverse of the tray, and the substantially circular portion engaging the circular walls of the notches 4. Then by grasping the upper part 8 of the dish and partially rotating it, the edges of the longest diameter of the lower portion 5 of the dish frictionally engage the opposite surfaces of the oppositely notched portions 4 and binds the dish and tray together. Obviously when the dish is turned in the opposite direction it is released from the tray and can be removed.

In lieu of the walls of the notches being at right angles to the base 10, they may be slightly undercut, as shown at 11, in Figure 5.

Obviously forming the lower portion of the dish and the tray as described, the two elements are securely held together, against liability of an infant separating them, and yet the elements may with convenience be separated.

What I claim is:

The combination of an elongated tray having a vertical edge flange, the flange having oppositely curved, substantially circular, notched portions in opposing inside vertical faces of the flange at the central portion of the tray, a generally round dish including a non-circular slightly elongated somewhat elliptical peripheral lower portion having a longer diameter for tightly engaging the opposite surfaces of the oppositely notched portions in the flange when said dish is turned to one position, said lower dish portion having a shorter diameter so that when the dish is turned to another position removal of the dish is easily accomplished.

OPLE L. WAGGONER.

REFERENCES CITED

The following references are of record in the file of this patent:

UNITED STATES PATENTS

| Number | Name | Date |
|---|---|---|
| D. 32,025 | Strugnell | Dec. 26, 1899 |
| 211,676 | Westlake | Jan. 28, 1879 |
| 212,208 | Franz | Feb. 11, 1879 |
| 506,849 | Hailes | Oct. 17, 1893 |
| 697,247 | Harris | Apr. 8, 1902 |
| 924,849 | Smith | June 15, 1909 |
| 1,135,269 | Dudley | Apr. 13, 1915 |
| 1,242,785 | Eldridge | Oct. 9, 1917 |
| 1,511,265 | Chilson | Oct. 14, 1924 |
| 2,109,955 | Carson | Mar. 1, 1938 |
| 2,118,326 | Richardson, Jr. | May 24, 1938 |
| 2,352,684 | Braddock | July 4, 1944 |

FOREIGN PATENTS

| Number | Country | Date |
|---|---|---|
| 7,514 | Great Britain | June 20, 1885 |
| 25,486 | Great Britain | Nov. 12, 1906 |